Patented Jan. 8, 1952

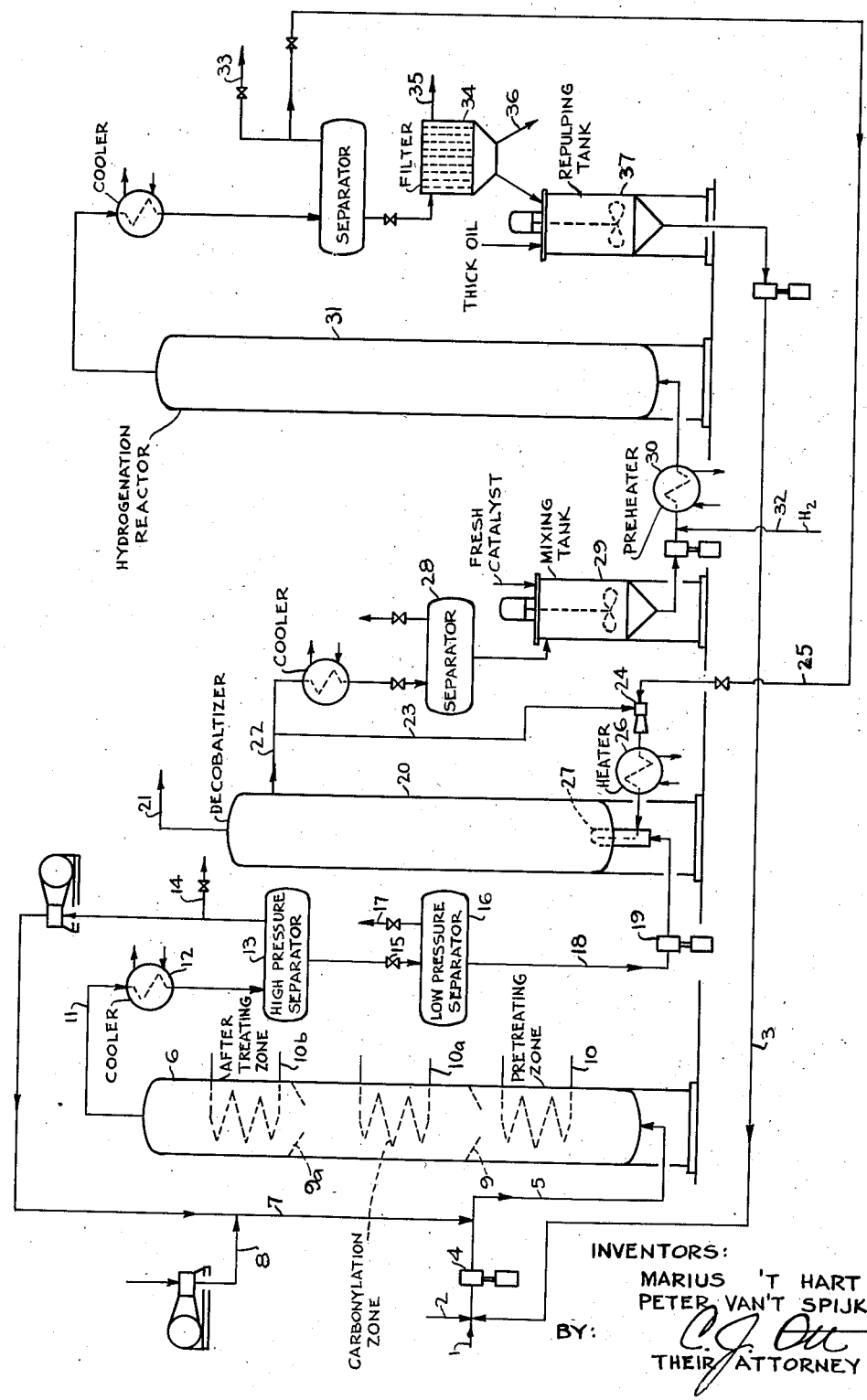

2,581,988

UNITED STATES PATENT OFFICE 2,581,988

SYNTHESIS OF CARBINOLS

Peter van 't Spijker, The Hague, and Marius 't Hart, Amsterdam, Netherlands, assignors to Shell Development Company, San Francisco, Calif., a corporation of Delaware Application October 17, 1950, Serial No. 190,523
In the Netherlands January 26, 1950

1 Claim. (Cl. 260—638)

This invention relates to an improvement in the synthesis of carbinols by the catalyzed addition of carbon monoxide and hydrogen to olefins or other compounds containing at least one olefinic double bond, which process is generally known as the Oxo-process. More specifically, this invention relates to an improvement in the synthesis of carbinols by the Oxo-process of the type in which the synthesis is carried out in steps and the catalyst is carried through the separate reaction zones as a slurry in the liquid reaction mixture.

The reaction conditions, reactants, catalysts and such particulars applicable in the Oxo-process are well known and described in the art. The method of operation in which the synthesis is carried out in steps and the catalyst is carried through the reaction zones in suspension in the liquid reaction mixture is also well known and described in the art.

In the multi-step Oxo-process the olefinic reactant, e. g. an olefin polymer or an olefinic concentrate from a cracked hydrocarbon fraction, is reacted with carbon monoxide and hydrogen in a first step or stage to give a product which consists largely of aldehydic products along with minor amounts of higher boiling oxygenated products ("thick oil"), carbinol, unreacted olefin, diluents, soluble cobalt compounds and suspended catalyst. This first stage is called the carbonylation stage since it is in this stage that the addition of the carbon monoxide takes place along with the addition of part of the hydrogen.

As stated, the product from the carbonylation stage contains dissolved cobalt. This dissolved cobalt is detrimental in the subsequent hydrogenation stage and, consequently, the product from the carbonylation stage is conventionally passed through a decobalting stage wherein it is subjected to conditions which cause the decomposition of the soluble cobalt compounds with the formation of insoluble metallic cobalt.

Following this decobalting stage, the product, including the suspended cobalt, is finally passed through a hydrogenation stage wherein the aldehydic intermediate products are converted to the carbinols. The product of this stage consists largely of the desired carbinols with lesser amounts of higher boiling oxygenated products ("thick oil"), diluents and suspended catalyst. This product is worked up to recover the desired carbinol in the desired degree of purity and this is effected at least in part by separating the suspended catalyst (usually by filtration) followed by fractional distillation.

The catalyst used is cobalt, and it is generally and preferably used in conjunction with a powdered carrier material of which the diatomaceous earth known under the trade name "Celite" is a good example. Cobalt is an excellent catalyst for both the carbonylation and the subsequent hydrogenation, and, as described, it serves as the catalyst for both stages in the process.

The catalyst declines in effectiveness at a slow rate and, consequently, it is the practice to recycle the catalyst, after separation from the product, back to the carbonylation stage to effect synthesis of further amounts of product. The amount of catalyst required to be supplied with the feed is relatively small, e. g. 4% by weight based on the olefinic reactant feed. Thus, in the typical operation of the process the catalyst filtered from the product is slurried in part of the feed or in a portion of the "thick oil," and a small amount of the slurry sufficient to supply the required amount of cobalt is added to the carbonylation stage, usually in suspension in the olefinic reactant.

However, the activity of the catalyst does decline slowly with use and, consequently, it is the practice to substantially continuously discard a minor portion (e. g. 10%) of the recycled catalyst and replace it with fresh catalyst. This is done in the obvious way which is to discard part of the filter cake and add fresh catalyst at the point where the remaining portion of the filter cake is repulped preparatory to recycling it back to the carbonylation stage.

We have now found that the described usual method of maintaining the activity of the catalyst by replenishment with fresh catalyst is not the best way to operate the process. We have found that the process may be improved if the fresh catalyst used for replenishment (replacement) is added at a point just preceding the hydrogenation stage. We have found that when the fresh catalyst is added at that point, rather than just before the carbonylation stage, the yield of product is improved and that this is due to a lesser formation of the undesired heavy by-products (thick oil).

The effect of fresh catalyst upon the formation of thick oil is illustrated by the following data. The feed was a C6–C8 fraction containing 86% olefins. The catalyst was cobalt mounted on Celite and contained about 33% by weight cobalt. The catalyst was supplied to the carbonylation zone as a slurry in the feed (about 4% by weight). The carbonylation was carried out in a baffled vertical upflow reactor having two jacketed sections. Other conditions were constant and as follows:

Pressure _____ 200 atm.
Liquid hourly space velocity
  calculated on both reactor sections_____ 1.08 l./l./hr.
Entrance gas rate_____ 1.5 Std. m.³/sec.
High pressure gas bleed___ 7×10⁻⁴ Std. m.³/sec.
Temperature:
  Inlet _____ 97° C.
  Bottom section_____ 145–160° C. gradient
  Top section_____ 145° C.

Over a period of 108 hours of continuous operation fresh catalyst was supplied to the carbonylation zone; then over a period of 217 hours only recycled catalyst was supplied to the carbonylation zone. The results are shown in the following table:

Table

|  | 1st Period | 2nd Period |
| --- | --- | --- |
| Olefin conversion percent | 99 | 97 |
| Yield percent by weight on C6–C8 feed | 122 | 121 |
| Yield from carbonylation stage in tons/ton C6–C8 feed: | | |
| Aldehydes | 0.59 | 0.79 |
| Thick oil | 0.40 | 0.19 |
| Yield after hydrogenation stage in tons/ton C6–C8 feed: | | |
| Alcohol | 0.85 | 0.89 |
| Thick oil | 0.22 | 0.14 |
| Alcohol/thick oil ratio | 3.8 | 6.3 |

It will be observed that, although the fresh catalyst gave a slightly higher conversion and yield of oxygenated products, the proportion of heavy oxygenated products (thick oil) was greater and the actual production of the desired alcohol was less.

The process of the invention is illustrated by the following non-limiting example which is described in conjunction with the flow diagram illustrated in the accompanying drawing.

Example

In this example, the feed is obtained by cracking paraffin wax and separating from the product of a $C_6$–$C_8$ fraction, having the following composition:

| | |
| --- | --- |
| $C_6$ percent by weight | 48 |
| $C_7$ percent by weight | 40 |
| $C_8$ percent by weight | 12 |
| Total olefin content _____percent | 87 |
| Sulfur _____do | 0.02 |

The catalyst is prepared by precipitating cobalt carbonate on Celite 290 followed by reduction at 500° C. in a stream of hydrogen and contains approximately 34.5% Co and 64.7% Celite.

The gas supplied to the carbonylation stage has the following composition in per cent by volume:

| | |
| --- | --- |
| $CO_2$ _____percent | 2 |
| $O_2$ _____do | 0 |
| Co _____do | 45 |
| $H_2$ _____do | 50 |
| $C_nH_{2n+2}$ _____do | 0.8 |
| $N_2$ _____do | 2.2 |
| S _____mg./Std. m.³ | <6 |

Referring to the drawing, the olefinic feed is introduced at a rate of 1300 kg./hr. by line 1. Recycle hydrocarbon containing about 26% olefins is introduced by line 2 at a rate of 390 kg./hr. (Recycle ratio of 0.3:1.) A catalyst slurry prepared by slurrying the catalyst separated from the final product in a portion of the thick oil to a concentration of 25% by weight is introduced by line 3 at a rate of 307 kg./hr. (about 4.5% catalyst by weight, based on the feed). Fresh synthesis gas is introduced by line 8 under a pressure of 200 atm. at a rate of 0.5 m.³/kg. of fresh olefinic feed. This gas is added to the recycle gas introduced by line 7 at a rate of 0.75 m.³/kg. of fresh olefinic feed. The mixture of reactants and catalyst is then passed by line 5 to the carbonylation reactor 6.

The carbonylation reactor is divided into three sections by bafflers 9 and 9a, and each section is provided with a coil—10, 10a and 10b—to allow independent control of the temperature in each section. The reactant mixture first passes up through the lower or pretreating zone maintained at a low temperature of about 110° C. The residence time in the pretreating section may be, for example, about 7 min. The pretreated mixture then passes upward into the carbonylation zone which is maintained at a temperature of about 160° C. Here the carbonylation reaction is initiated and carried out. The top section, called the after treating section, is maintained at a lower temperature, e. g. 80° C.

The reaction product from the carbonylation stage is withdrawn from the carbonylation reactor by line 11 and, after cooling in a cooler 12, is passed to the high pressure separator 13. A part of the separated gas may be withdrawn from the system, if desired, by line 14. The remainder of the separated gas is recycled by line 7, as described. The liquid product containing suspended catalyst is then expanded through valve 15 into the low pressure separator 16. The liberated gas is withdrawn by line 17. The liquid product is then passed by line 18 and pump 19 into the decobaltizer 20 where it is heated to a temperature of about 190° C.

In the system illustrated, the decobalting is carried out in a unique and very advantageous manner. The necessary heat is supplied by superheating and recycling a part of the decobalted product, and this recycle is effected without mechanically pumping the slurry. Thus, the decobalted product (slurry) withdrawn by line 22 is divided into two streams. One stream (3800 kg./hr.) is passed by line 23 to an injector 24. Hydrogen gas from the subsequent hydrogenation stage is passed to the injector by line 25. This gas circulates the slurry through the heater 26 and back into the decobaltizer. The mixture of gas and decobaltized product is superheated to about 275° C. and preferably enters the bottom of the decobaltizer through a nozzle 27 which mixes it with the incoming feed. It is essential that a hydrogen pressure in the heater 26 be maintained at about 10 atm. or above. In the case illustrated, a pressure of 50 atm. is maintained. The gas is withdrawn from the decobaltizer by line 21.

The remaining decobalted product withdrawn by line 22 is cooled and then expanded into separator 28. Released gas is vented and the slurry is then passed to a mixing tank 29. Here fresh catalyst is added in an amount sufficient to maintain the catalyst at the desired level of activity, e. g. 10% of the catalyst being circulated.

The slurry from mixing tank 29 is pumped through the preheater 30 to the hydrogenation reactor 31. Here the hydrogenation is effected at 150 atm. pressure and 180° C.–200° C. by fresh hydrogen added by line 32. The hydrogenated product is cooled and passed to a separator in the conventional manner. Part of the unused hydrogen may be withdrawn by line 33 or recycled to the system. A part of the hydrogen is passed by line 25 to the injector 24 as described. The hydrogenated slurry is passed from the separator to a filter 34. The liquid product is withdrawn by line 25 and may be worked up in any way desired. Part of the filter cake is withdrawn from the system by line 36 and the remainder is recycled to the carbonylation zone. Thus, part of the catalyst is passed to the repulping tank 37 where it is mixed with "thick oil" and the concentrated slurry is passed to the carbonylation zone by lines 3 and 5, as previously described.

When working in this manner, 0.937 ton of $C_7$–$C_9$ alcohol may be obtained per ton of the olefinic feed.

We claim as our invention:

In a process for the synthesis of a carbinol by carbonylation using a cobalt catalyst which is passed in suspension in the reaction mixture through a first carbonylation stage and a subsequent hydrogenation stage, the improved method of maintaining the activity of the catalyst at a desired level which comprises adding a quantity of fresh catalyst to the reaction mixture subsequent to said carbonylation stage and prior to said hydrogenation stage, separating suspended catalyst from the reaction mixture from said hydrogenation stage, withdrawing and discarding an amount of the separated catalyst equal to the quantity of said fresh catalyst added, and recycling the remainder of the catalyst to the carbonylation stage.

PETER VAN 'T SPIJKER.
MARIUS 'T HART.

REFERENCES CITED

The following references are of record in the file of this patent:

UNITED STATES PATENTS

| Number | Name | Date |
|---|---|---|
| 2,504,682 | Harlan, Jr. | Apr. 18, 1950 |
| 2,564,456 | Vlugter et al. | Aug. 14, 1951 |